Dec. 29, 1931. E. DEVEAUX 1,839,015
AUTOMOBILE BUMPER AND MOUNTING THEREFOR
Filed May 21, 1930 3 Sheets-Sheet 2
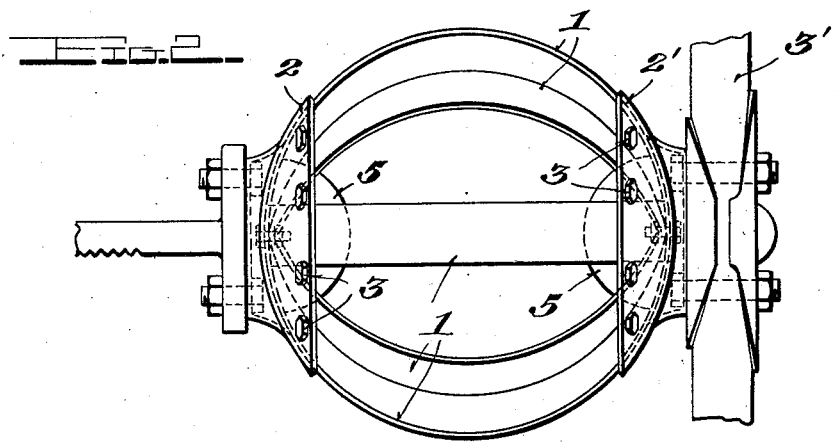
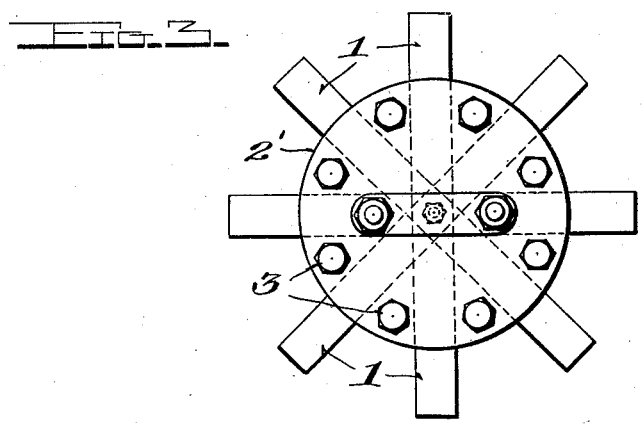
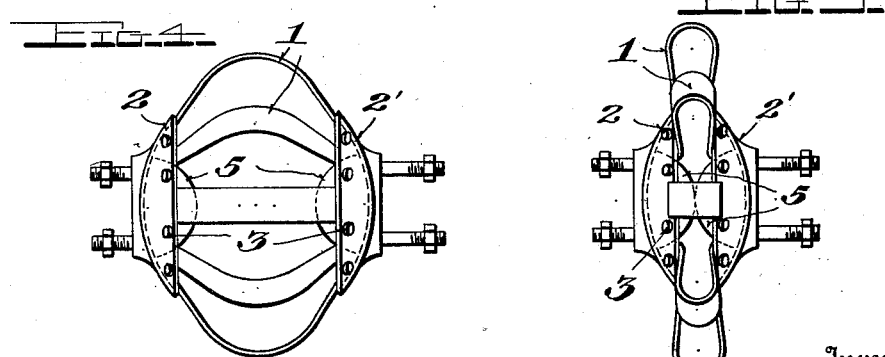
Inventor
*Ernest Deveaux,*
By
Attorneys Dec. 29, 1931. E. DEVEAUX 1,839,015
AUTOMOBILE BUMPER AND MOUNTING THEREFOR
Filed May 21, 1930 3 Sheets-Sheet 3
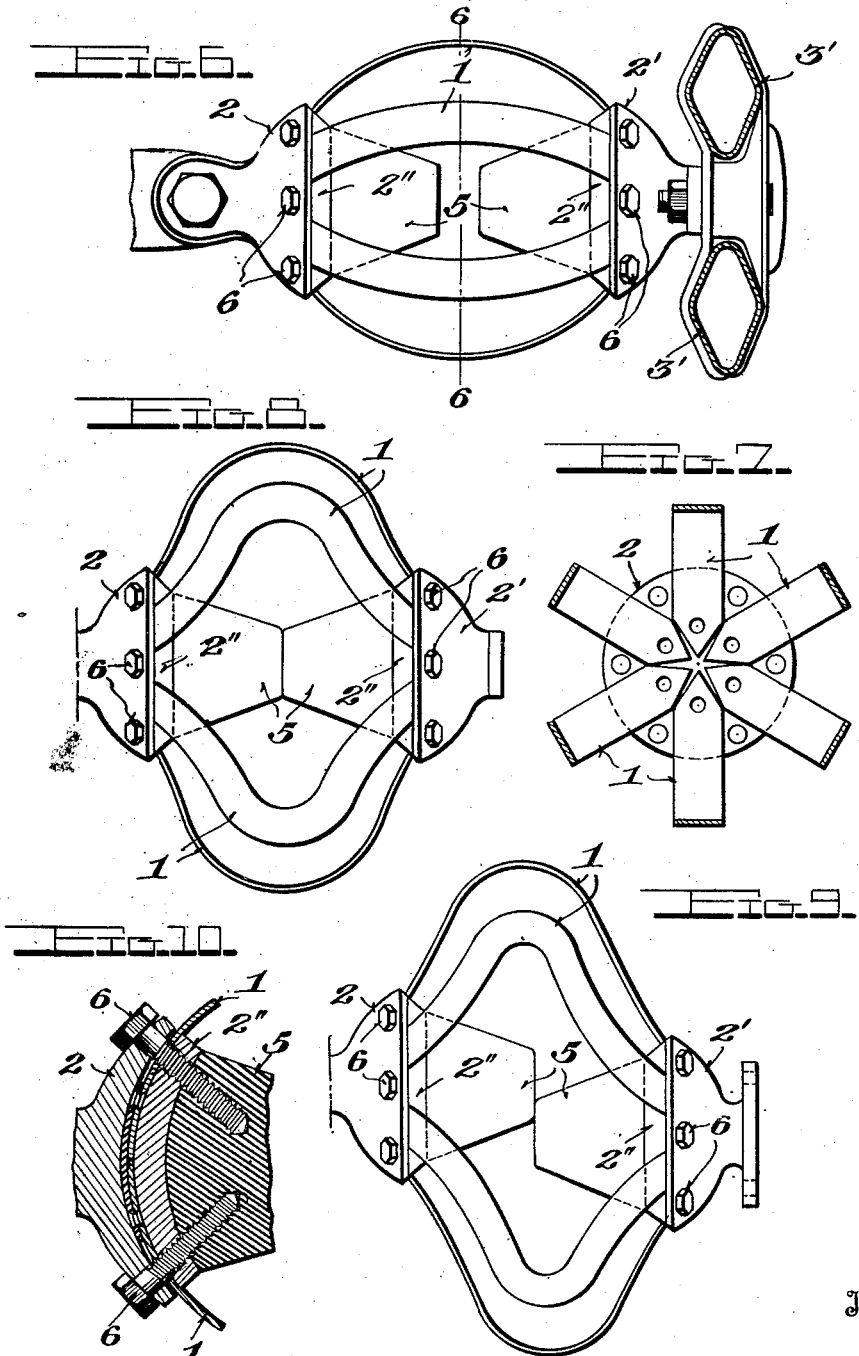

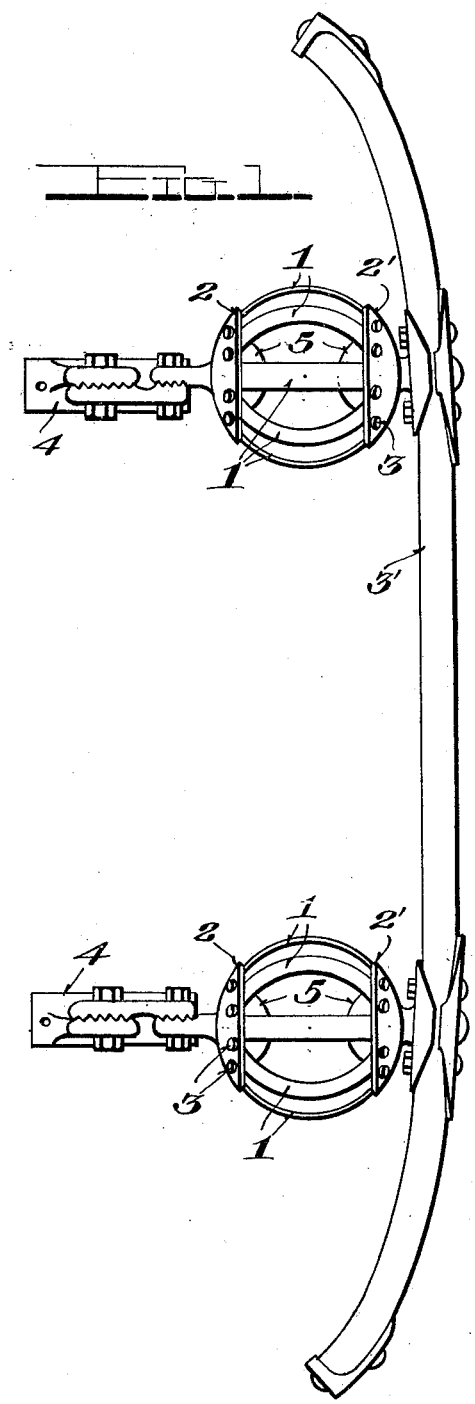

Patented Dec. 29, 1931

1,839,015

UNITED STATES PATENT OFFICE

ERNEST DEVEAUX, OF BOEN-SUR-LIGNON, FRANCE, ASSIGNOR TO WILLIAM W. MACFARLANE, OF WASHINGTON, DISTRICT OF COLUMBIA

AUTOMOBILE BUMPER AND MOUNTING THEREFOR

Application filed May 21, 1930, Serial No. 454,363, and in France June 7, 1929.

This invention relates to bumpers or shock-absorbers for vehicles, and is applied specifically in this case to bumpers for automobiles.

Heretofore, bumpers have operated on the principle of acting as a guard or buffer for the vehicle which carries them, or through the principle of the elasticity of the bar receiving the impact of collision. This invention relates to a true shock-absorber for the impact, so that the impact will not be transmitted to the mechanical parts of the vehicle, or be felt by the occupants of the automobile.

Referring to the accompanying drawings in which like characters of reference are indicated by corresponding marks of reference,—

Figure 1 is a top plan view of a front part of an automobile carrying a bumper of my improved type.

Figure 2 is a top plan view of one of the shock-absorbing elements of Figure 1, in its normal state.

Figure 3 is a front elevation of Figure 2 along the inside of the bumper 3'.

Figure 4 is a showing of the shock-absorber in Figure 2, under the effects of a slight impact on the bumper.

Figure 5 shows the shock-absorber of Figures 2 and 4, under the effects of a heavy impact on the bumper.

Figure 6 is a modified form of showing of Figure 2, being slightly elliptical in form.

Figure 7 is a vertical section on line 6—6 of Figure 6.

Figure 8 shows the shock-absorber of Figure 6 under compression.

Figure 9 shows the shock-absorber of Figure 8 under the effects of a shock on the bumper from a point on one side of the bumper.

Figure 10 is a vertical section through the rubber block within the shock-absorber shown in Figures 6, 8 and 9.

The shock-absorbing element of the bumper in Figure 2, is composed of steel springs in the form of bands or hoops 1, of different size, which, when brought together, form a basket in the form of a sphere. These hoops or bands 1 are held in their proper relation to form the sphere by the hemispherical caps 2—2', through the bolts 3. The caps 2' and 2 are attached to the bumper 3' and to the bracket 4 on the chassis of the car, thus holding the bumper in place either on the front or back of the automobile. The caps 2'' are the counterpart of the caps 2—2' and form the inner support for the hoops or bands 1. As the bands or hoops 1 must be held and work in a fixed position and retain shape after an impact on the bumper, the function of the bolts 3 is to retain the bands in their fixed position to avoid any lateral displacement of the bands under impact. Within the basket formed by the hoops 1 are the hemispherical rubber blocks 5 which come into play and absorb the final shock, if the shock is sufficient to compress the spring bands 1 to a position shown in Figure 5. These rubber blocks 5 are attached to the inner hemispherical caps 2''.

The sphere formed by the hoops or bands 1 is elastic in every way, and its flexibility is the same in all directions around the point of attachment to the vehicle. On the slightest impact opposite the movement of the vehicle, the shock-absorber will take up the jar and assume the position shown in Figure 4 of the drawings. If the impact is of great violence, the shock-absorber will assume the position shown in Figure 5. It will be noted in Figure 5 that when the steel bands or hoops 1 have given up to their maximum distortion, the rubber or elastic blocks 5 which are diametrically opposite each other, come into play to prevent the permanent distortion of the shock-absorbing device. As flexibility of the shock-absorber is the same in all directions it matters not from which direction the angle of shock comes as the spring cage will return to its normal position after the impact has passed.

In Figures 6 to 10, inclusive, is shown a device like that described in detail in Figures 2 to 5 inclusive. In Figure 6, the springs or bands 1 are not continuous, in that they do not form loops or hoops. There is a further difference from the shock-absorber described above, in that the general shape of the spring bands is that of an ellipse, instead of a sphere, as was described in the Figures 2 to 5, inclusive. As stated, in Figures 6 to 10, the steel springs 1 do not form hoops as is shown in detail in Figure 7. The lines of each of these springs 1 converge to the center of the cap 2 and 2' where they are held in place by the caps 2''. The point where the springs converge adjacent to the automobile bumper is of course, an extension of that where the springs converge on the opposite cap attached to the chassis of the automobile.

The rubber blocks 5 in Figures 6 to 10, inclusive, are in the form of a four-sided pyramid with the head or apex removed. The inner and outer caps 2—2' and 2'' are attached together by the screw bolts 6, which also hold the rubber blocks 5 in place. The advantage of the construction shown in Figures 6 to 10, inclusive, is that there is always a substantial place of contact between the rubber blocks 5 on the compression of the springs 1.

While I have shown this invention applied to an automobile, there is no reason why this invention cannot be applied to other vehicles, or at any place where an impact or shock is to be absorbed.

Having thus described my invention, what I desire to claim and secure by Letters Patent is:—

1. In a shock-absorbing device, the combination of a bar to receive an impact and individual springs which form a substantially spherical basket attached thereto to take up said impact.

2. In a shock-absorbing device, the combination of metal springs forming a substantially elliptical basket when brought together with means for attaching said basket to a bar which receives an impact.

3. In a shock-absorbing device, the combination of a bar to receive an impact and individual metal springs which form a substantially spherical basket attached thereto, with an elastic member within the basket to take up the impact after the steel springs have been depressed in a certain degree.

4. In a shock-absorbing device, the combination of a bar to receive an impact and resilient metal springs which form a substantially spherical basket, with resilient blocks within the basket, said blocks being in the form of a four-sided pyramid with the head or apex removed.

5. In a shock-absorbing device, the combination of substantially elliptical bands of resilient metal mounted one within the other but at different angles, with other shock-absorbing means within the said bands.

6. In a shock absorbing device, the combination of individual pieces of resilient metal brought together so that the lines of each individual piece converge at two points to form a substantially spherical basket, with means for holding the individual pieces of metal in such position.

7. In a shock absorbing device, the combination of individual pieces of resilient metal brought together so that the lines of each individual piece converge at two points to form a substantially spherical basket, with means for holding the individual pieces of metal in such position, and for attaching said basket between the element that receives the impact and a vehicle.

8. In a shock absorbing device the combination of individual resilient members, arranged in a fixed position so that the individual members converge at two points and form a basket.

In testimony whereof I hereunto affix my signature.

ERNEST DEVEAUX.